United States Patent [19]
Cobarg et al.

[11] 3,893,755
[45] July 8, 1975

[54] MIRROR WITH ADJUSTABLE FOCAL DISTANCE

[75] Inventors: Claus Christian Cobarg, Steinbach; Walter Kliegel, Schwalbach, both of Germany

[73] Assignee: Braun Aktiengesellschaft, Kronberg, Taunus, Germany

[22] Filed: Nov. 12, 1973

[21] Appl. No.: 415,005

[30] Foreign Application Priority Data
Nov. 15, 1972 Germany.............................. 2255789

[52] U.S. Cl.................................. 350/295; 350/295
[51] Int. Cl. ....................................... G02b 5/10
[58] Field of Search................... 350/288, 293, 295; 240/44.1, 103 A

[56] References Cited
UNITED STATES PATENTS

| | | | |
|---|---|---|---|
| 3,031,928 | 5/1962 | Kopito | 350/295 |
| 3,254,342 | 5/1966 | Miller | 350/295 |
| 3,580,082 | 5/1971 | Strack | 350/295 |

*Primary Examiner*—James W. Lawrence
*Assistant Examiner*—Davis L. Willis
*Attorney, Agent, or Firm*—Ernest F. Marmorek

[57] ABSTRACT

The present invention provides an improved, adjustable focal length mirror that includes a tubular member having one end closed by a first transparent wall. A second, deformable wall that has a reflecting surface in opposition to the transparent wall is mounted in the tubular member in order to define therewith, and in combination with the transparent wall, a first hollow space. A frame is also provided for supporting the deformable wall in spaced opposition to the transparent wall. The supporting frame is sealingly mounted relative to the tubular member in order to make the hollow space airtight and means are provided for selectively displacing said supporting frame and or said deformable wall in directions towards and away from the transparent wall.

10 Claims, 24 Drawing Figures

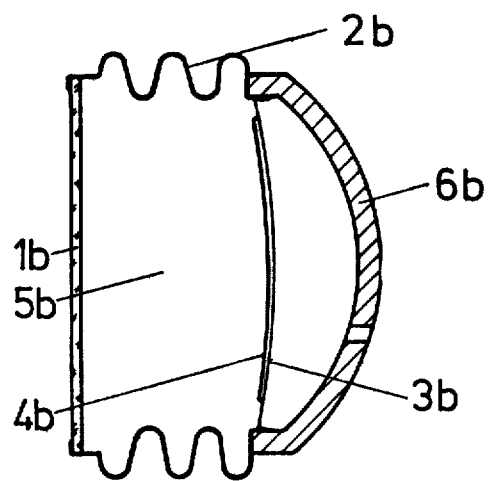
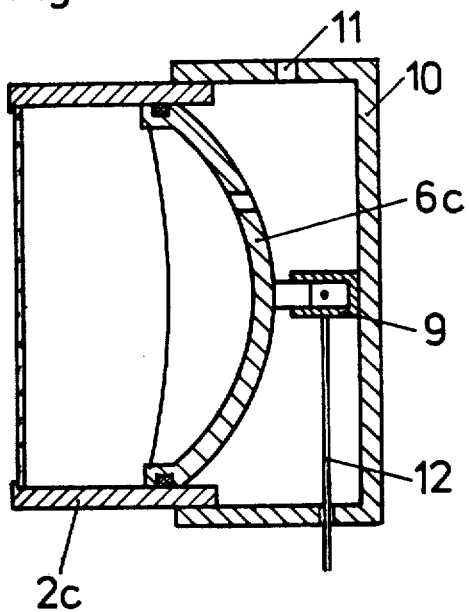
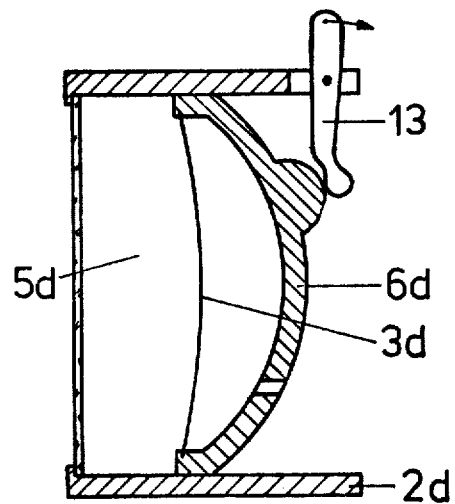
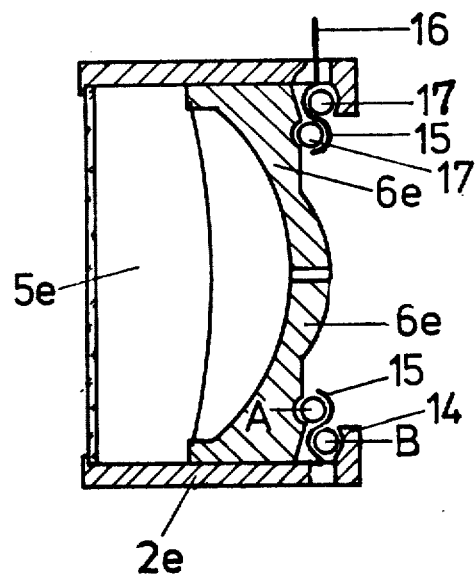

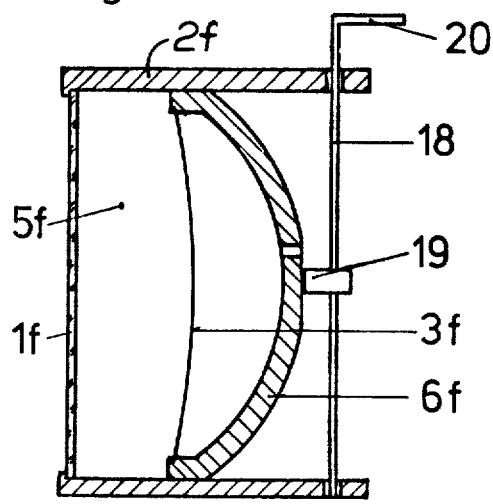
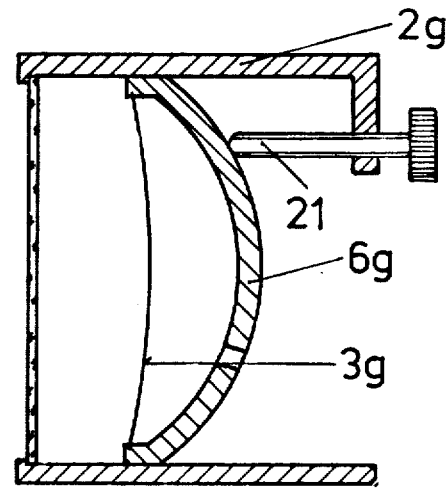
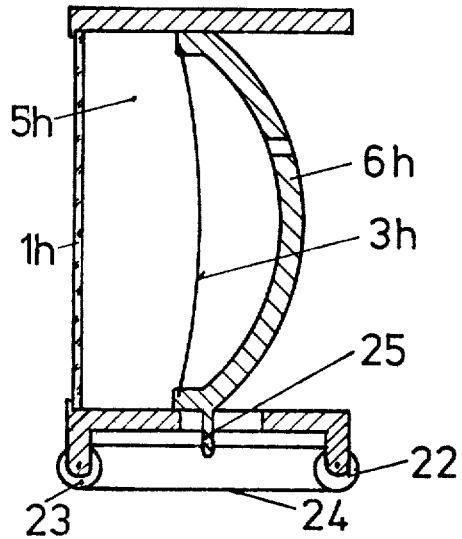
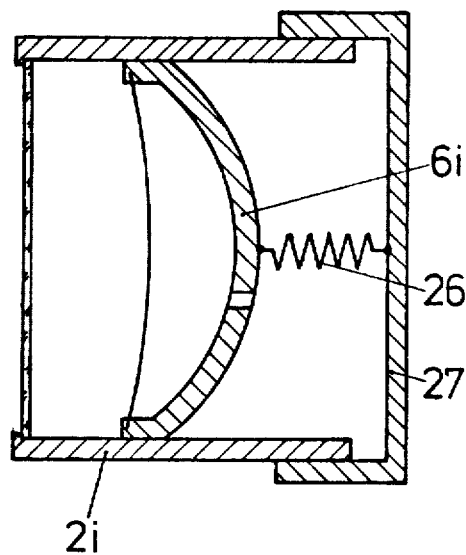

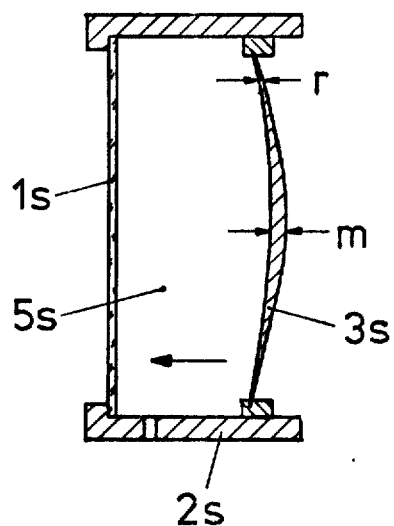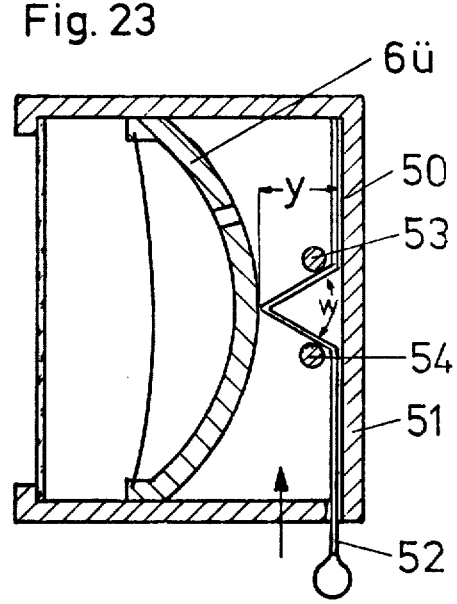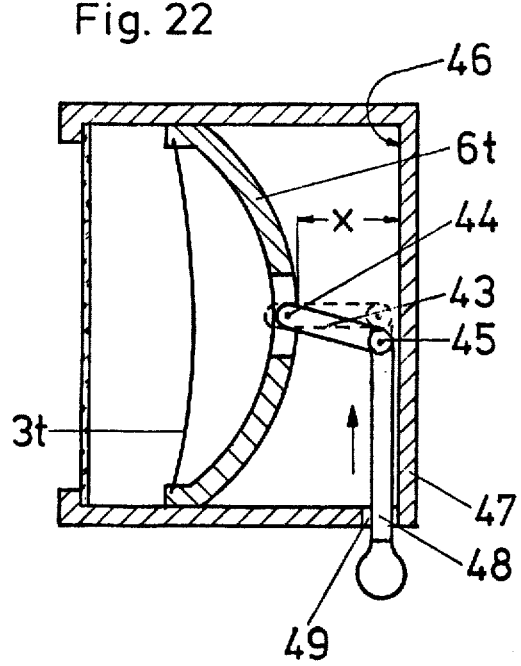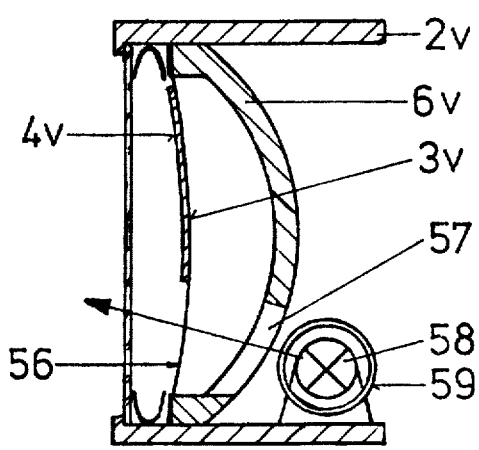

MIRROR WITH ADJUSTABLE FOCAL DISTANCE

The invention relates to a mirror having an adjustable focal length, especially to a cosmetics or automobile mirror having two walls spaced from each other and extending in parallel planes which are joined with each other directly at their edges or by means of a frame member and which enclose a hollow space the inner pressure of which is variable and in which one the the walls carries a reflecting or mirror layer and in which the other wall surface is deformable.

Reflecting surfaces from elastically deformable metal foils and also from elastically deformable synthetic foils coated with an appropriate metal, preferably aluminum, are known.

A cosmetic mirror became also known having an adjustable focal length (Swiss Pat. No. 498,405), in which a uniformly tensioned, elastically deformable, reflecting foil forms at least partially one of the walls of a space which otherwise is closed by rigid walls, and wherein on one of the rigid walls means are provided for producing a variable vacuum in the closed space in order to adjust the focal length of the mirror.

This cosmetic mirror has the disadvantage that its elastically deformable reflecting foil faces the observer of the mirror without being covered.

It has been found in practice that the foil during the everyday use of the mirror becomes quickly soiled by, for example, lipstick spots, powder or hair spray depositions. Practically it is impossible to remove such depositions and spots on the foil since the foil becomes deformed each time it is touched and would loose its symmetrical form. It is also noted that the foil becomes easily scratched and after a time it becomes blind, that is, will loose its reflective properties also for the reasons that the reflecting layer becomes chemically decomposed or will peel off from the foil.

A further substantial disadvantage of such a known cosmetic mirror resides in that the hollow space between the rigid wall and the mirror layer carrying foil must be partially evacuated with the help of a pump which can be performed only by actuating the pump several times. The foil will arch itself with each pump operation of the spherically shaped bellows arranged on the rigid wall with each pumping operation more and more and unevenly so that the observer of the mirror will find it difficult to adjust the arching of the foil which after all is his main desire.

Furthermore a mirror using the energy of the sun and the electrical supply in space stations and in space satellites became known (DAS No. 1,199,017), which consists from an inflatable donut-shaped body having a circular cross-section and having an inner and an outer sleeve for receiving a supporting structure between the inner and outer sleeve which is chemically formed at the destination between the inner and outer sleeve and an inflatable lense body secured to the inner side of the donut, in which the lense body consists of a foil having a metal coating on one side and which is capable of assuming a paraboloid shape and a second foil which by spacing member is held at an approximately constant distance and which defines a space for the receiving a second supporting structure and a third foil defining the other limit of the lens body and which for the purpose of its separation after the supporting structure has been introduced is provided with at least one separation point. It is clear that a mirror which is structured as above will not be usable for cosmetic purposes or as an automobile mirror since the above-described mirror practically can be used only once and the air volume in the hollow space defined by the foil cannot be varied.

It is an object of the present invention to provide a mirror of the above-described type which can be easily handled, that is, the focal length of which can be easily adjusted, which can be easily cared for, which is robust and insensitive and at the same time it can be economically produced and in which the reflecting surface will retain in a constant fashion to focal length which has been set until another focal length is desirable. The mirror should be structured in such a manner that the sensitive reflecting layer should remain free of dust and dirt even after several years of use.

The above will be attained according to the present invention whereby at least one of the walls of the mirror is made from a transparent material, preferably from glass or acryl glass and the mirror layer which is provided on the front or back surface of the wall is constructed as a reflecting surface of one of the wall facing the hollow space.

It is preferred that at least one of the two walls which enclose the space along their circumferential edges or on their smaller side is tightly sealed with the frame member coupled to the other wall and is guided in such a manner that when such wall is adjusted or shifted or when both walls are shifted, the pressure is varied in the space. Also, when for example, the deformable wall is moved in the direction of the wall made from glass, then the pressure increases in the hollow space between both walls to an extent that the deformable wall will arch outwardly, that is, it will assume the shape of a concave mirror.

According to the present invention at least a part of one and/or of the other walls enclosing the hollow space with a variable inside pressure consists from a foil, preferably a foil made from a synthetic material or metal.

In order to prevent the foil from becoming damaged, the wall which is partially formed from a foil is provided with a cover or a sleeve-like stiffening or supporting member which overlaps the foil and which is supported on the circumferential edge of the foil.

Preferably one of the walls on its radially outer edge or on its small side is provided with a circumferential sealing member which tightly seals the adjustable wall with respect to the frame member. It is also possible that the radially outer edges or small side of the walls which extend behind each other in parallel planes are coupled seal-tight with each other by means of a profile ring or a collar-like sealing member made from an elastomer or by means of a bellows made for example from metal.

According to the present invention the wall is allowed to move for the purpose of varying the pressure in the space by the provision of a hydraulic or pneumatic operating device coupled to the frame member or supported on the mirror support or housing which is integrally formed with the frame member and which can be for example an operating cylinder arranged on the stiffening member or on one of the walls or is in the form of an inflatable hollow body made from an elastomer. In a preferred embodiment on the frame member or on the mirror support there is provided a lever in a tiltable fashion, one arm of which lies against the movable wall or against the stiffening member in such a manner that when the lever is tilted in a plane vertical to the wall, then the wall will move with respect to the frame member or with respect to the mirror support.

According to the present invention on the frame member or on the mirror support a ring is provided lying on roller means journalled in run-up ramps, which ring when rotated in a plane parallel with respect to the plane of the wall will influence the stiffening member or the wall and will shift same with respect to the other wall.

In another embodiment in the frame member or in the mirror support a shaft is rotatably journalled and is provided with a cam and wherein the shaft or the cam during rotation of the shaft will influence the stiffening member in such a manner that the stiffening member will shift itself with respect to the frame member. In order that a shifting could be performed also by means of a setting screw, there is provided at least one set screw on the frame member or on the mirror support or it is supported against them in such a manner that the thread carrying shaft of the set screw operates against the movable wall or against the stiffening member and will move such wall with respect to the other wall enclosing the space.

Another shifting or adjusting is possible in that on the frame member and/or on the mirror support there are provided guide rollers or guide lugs or a pull cord drum over which a cord or a belt is wound and which is connected with the movable wall or with the stiffening member and when the roller or the drum is rotated, the movable wall will move one way or the other. In another embodiment the movable wall can be shifted against the force of a spring member, for example a steel spring or a rubber profile ring, which at one end is supported on the frame member or on the mirror support and at the other influences the wall or the stiffening member.

In order to prevent that the foil during the varying of the pressure in the hollow space could not arch itself too strongly or assume an undesired shape, after the wall has moved and after the highest admissible pressure in the space has been reached the wall portion made from the foil will lie against the stiffening member or the support member and will adjust it shape to the shape of the support member so that it cannot undergo any further arching.

In order to attain the highest possible sealing for the hollow space, according to the present invention at least one wall on its circumferential edge or on its small side is provided with a bulge or profile ring or a membrane seal made from an elastomer and which surrounds the wall and protrudes outward from the plane of the wall and the circumferential outer small side of which is coupled with the frame member in a fixed manner and allows a shifting of the wall in the direction of the other wall in one or the other direction.

The invention provides that both walls forming together with the frame member a space for the purpose of varying the pressure in the hollow space can be shifted with respect to the frame member and wherein a shifting arrangement or adjusting arrangement supported on the frame member and operable mechanically, pneumatically or hydraulically, will operate on the front wall or one the back wall. In order to compensate any imaging error which may have been produced by the arching of the mirror the invention provides that the wall arranged opposite with respect to the wall carrying the reflecting surface is shaped as a plane parallel glass disc or as an objective lens, for example as a collector lens, diverging lens or a Fresnel lens.

The invention provides for various embodiments some of which are schematically illustrated in the attached drawings, in which:

FIG. 5 illustrates a mirror embodiment having a frame member made from a metal bellows;

FIG. 6 illustrates a mirror in longitudinal section having a pneumatic adjusting device for the supporting member;

FIG. 7 illustrates a mirror in longitudinal section the supporting member of which is operated by a lever;

FIG. 8 illustrates a mirror in longitudinal section the supporting member of which containing the foil is adjustable by means of a ring operable with rollers on a run-up ramp;

FIG. 9 illustrates a mirror in longitudinal section having a supporting member operable by means of a cam;

FIG. 10 illustrates a mirror in longitudinal section having a supporting member operable by means of a set screw;

FIG. 11 illustrates a mirror in longitudinal section having a supporting member operable by means of a pull cord;

FIG. 12 illustrates a mirror in longitudinal section having a supporting member adjustable against the force of a spring;

FIG. 21 illustrates a mirror in longitudinal section having a deformable wall having non-uniform wall thickness;

FIG. 22 illustrates a mirror in longitudinal section having a supporting member adjustable by means of a lever; and FIG. 23 illustrates a mirror in longitudinal section having a supporting member adjustable by means of a flexible band;

FIG. 24 illustrates a mirror in longitudinal section having a partially reflecting deformable wall and illumination.

Figure 1:
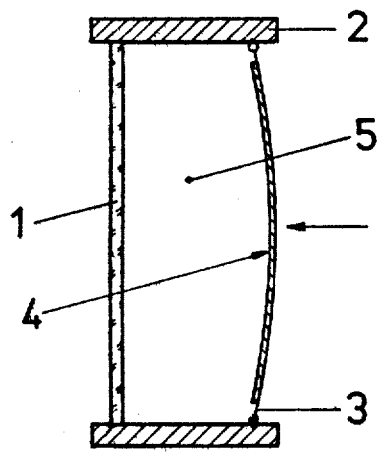
FIG. 1 is an illustration of the principles of a mirror having an adjustable focal length and a deformable and shiftable wall.
Figure 2:
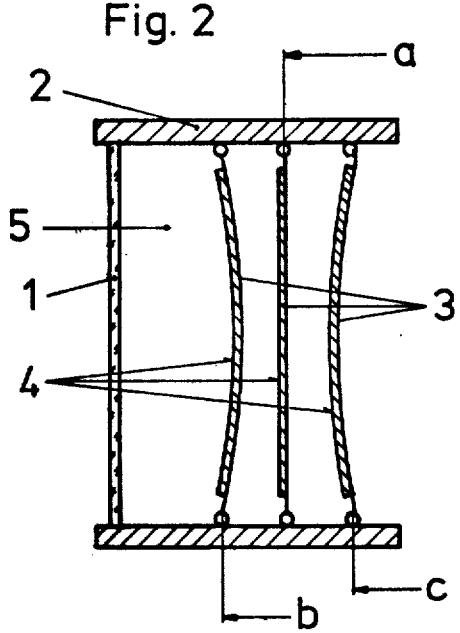
FIG. 2 illustrates the principle of a mirror having a shiftable and deformable wall according to FIG. 1 wherein the wall is illustrated in various positions.

The mirror according to FIG. 1 consists of a transparent glass plate 1, for example ring-like frame member 2 and a wall 3 made from a synthetic foil fixedly coupled to the frame member and being deformable, wherein the wall 3 is provided with a reflecting layer 4. If the wall 3 is shifted in the direction of the arrow, that is, in the direction of the glass plate 1 to position b, as it is schematically illustrated in FIG. 2, then the pressure will change in the hollow space 5 enclosed by the members 1, 2 and 3 and particularly, a pressure increase will take place. On the other hand a decrease in pressure will take place, that is, a vacuum will be present, if the deformable wall is moved from position a in the back position c. The pressure increase in the hollow space 5 has its consequence in that the deformable wall 3 will arch outwardly so that the reflecting layer 4 of the deformable wall 3 will reflect the light rays falling through the glass plate 1 as a concave mirror. In the event there is a low pressure, then the deformable wall 3 will arch in the direction toward the hollow space 5 so that the reflecting layer will reflect the light rays falling in through the glass plate 1 as a diverging mirror.

Figure 3:
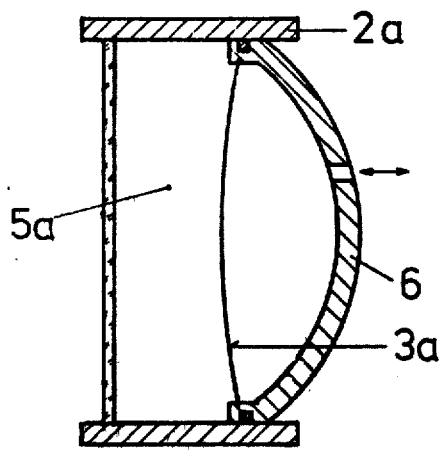
FIG. 3 illustrates a mirror in longitudinal section in which the deformable wall is supported by a cover-like stiffening or supporting member.
Figure 4:
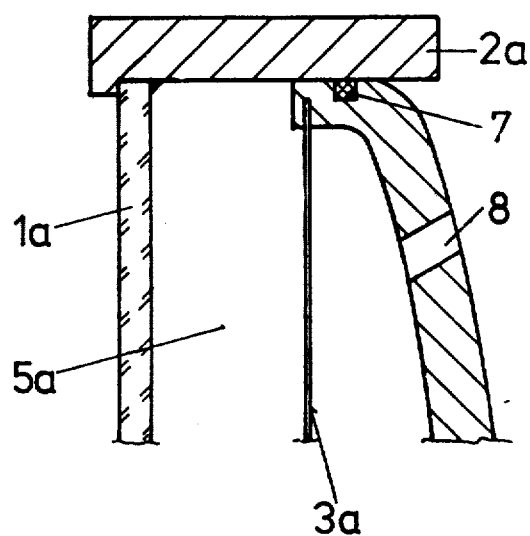
FIG. 4 illustrates a mirror according to FIG. 3 in partial section, in which the sealing means between the supporting member and the frame member is especially recognizable.

In order to attain a reliable shifting of the deformable wall 3a, it is preferred that it should be set into a supporting frame 6 which as can be seen in FIG. 3 and in FIG. 4, is sealed with respect to the frame member 2a by means of a sealing means 7. In the event the pressure in the hollow space 5a shosuld be increased, then all that is necessary is that the mirror should be grabbed at the frame member 2a and by applying a pressure by the fingers moving the supporting member 6 in the direction toward the glass plate 1a. In order that no pressure buffer could form between the deformable wall 3a and the supporting member 6 which would prevent the arching of the foil, the supporting member 6 is provided with an exhaust bore 8 which lets the air out.

In the embodiment according to FIG. 5 instead of a ring-shaped rigid frame member a frame member made from a metal bellows 2b is provided. The supporting member 6b is fixedly connected with the bellows 2b and wherein the deformable wall 3b is set in an air-tight fashion in the supporting member. If the supporting member 6b is shifted toward the glass plate 1b, then the pressure increases in the hollow space 5b and the foil 3b having the reflecting layer 4b thereon will assume the shape of a concave mirror.

In the embodiment according to FIG. 6 the supporting member 6c is shifted by means of a special hydraulic or pneumatic cylinder 9.

In the remaining parts this mirror is similar to the one illustrated in FIGS. 3 and 4, however, there is a difference in that the frame member 2c is increased by the addition of a pot-shaped housing member 10 having an exhaust bore 11 in order to provide a fixed support for the operating cylinder 9. The necessary actuating cylinder which is coupled to the conduit 12 is not shown in the drawing.

The mirror according to FIG. 7 differs from those of FIGS. 3 and 4 in that the supporting member 6b can be shifted by means of a operating lever 13 tiltably mounted on frame member 2d. If the pressure in the hollow space 5d must be increased, then it is necessary that the lever 13 be tilted in the direction of the arrow. The resetting of the supporting member 6d and of the deformable wall 3d is performed by the elasticity of the air cushion enclosed in the hollow space 5d itself, thereby the lever 13 will assume again its initial position, or there is provided also a resetting spring or the members 6d and 13 are positively coupled.

In the embodiment illustrated in FIG. 8 between the supporting members 6e and the projecting edge 14 of the frame member 2e there is provided a pivotable ring 15 having a hand lever 16 projecting radially and journalled in run-up ramps in a rotable fashion and wherein the ring 15 is supported on rollers 17,17 and also on the edge 14.

If the ring 15 is rotated by means of the hand lever 16 then the rollers 17 lying against the support member 6e will also rotate while the roller 17 will abut against the fixed edge 14, so that the ring 15 will move to the left and also the supporting member 6e will move into this direction, relative to the frame member 2e. This embodiment of the mirror has the advantage that the pressure in the hollow space 5e can be finely adjusted by means of the hand lever 16.

The mirror according to FIG. 9 is provided with a cam shaft 18 journalled in the frame member 2f, wherein the cam 19 abuts against the back portion of the supporting member 6f and in such a manner that during rotation of the cam shaft 18 by means of the lever 20 one can attain the necessary shifting of the supporting member 6f in order to produce the variation of the pressure in the hollow space 5f between the glass plate 1f and the deformable wall 3f.

The mirror according to FIG. 10 is provided for the shifting of the deformable wall 3g and of the supporting member 6g connected therewith a set screw 21 journalled in the frame member 2g, the head of which lies against the supporting member 6g. If the set screw head 21 is rotated, then the supporting member 6g and the deformable wall 3g therewith will be shifted.

As can be seen in FIG. 11 instead of a lever actuation, or a set screw or a cam shaft actuation one may provide a cord train 24 which is fixed to the supporting member 6h at 25. The shifting of the supporting member 6h is performed similarly like the moving of an indicator, by rotating one of the rollers 22,23.

In the embodiment illustrated in FIG. 12 the supporting member 6i is coupled to the housing portion 27 by means of a tension or compression spring 26, wherein the housing portion 27 is connected also with the frame member 2i. The spring 26 can be dimensioned in such a manner that an adjusting device which is not shown in detail for adjusting or shifting of the supporting member 6i will either aid or increase the force necessary for the shifting.

Figure 13:
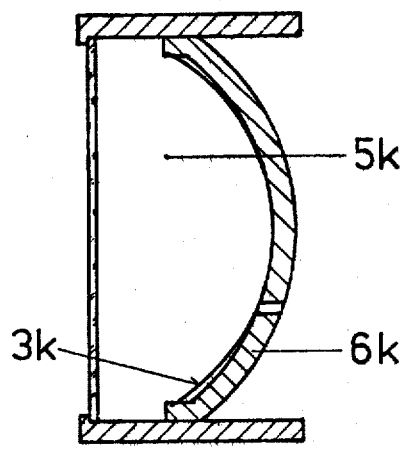
FIG. 13 illustrates a mirror in longitudinal section having a foil which at high pressures in the hollow space will lie against the supporting member.

In the mirror according to FIG. 13 the pressure in the hollow space 5k is increased to an extent that the foil 3k carrying the reflecting layer will abut against the inner side of the supporting member 6k. In this manner it is assured that the foil 3k even if the pressure is further increased will not become damaged. In addition it is also possible that the abutting of the foil onto the supporting member the foil will be able to assume a certain arching at a pressure increase, for instance, an assymmetrical arching.

Figure 14:
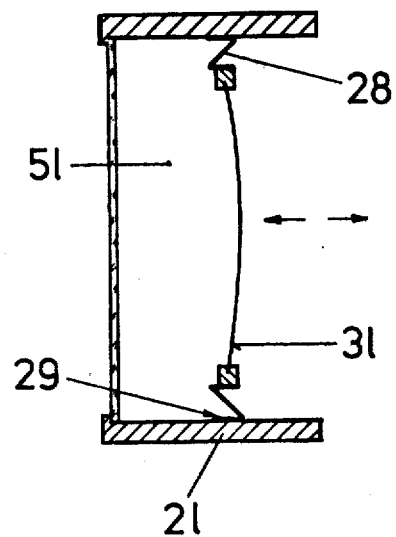
FIG. 14 illustrates a mirror in longitudinal section in which the foil is coupled with the frame member by means of a profile ring.

The mirror according to FIG. 14 is provided with a deformable wall 31 which by means of a profile ring 28 from rubber or from an elastic synthetic material is fixedly coupled to the frame member 21 at 29. The profile ring 28 is constructed in such a manner that the shifting of the deformable wall 31 in the direction of the arrow is performed thereby to a certain extent. This embodiment has the advantage in that the support member here, among other things, will not be required, in addition the hollow space 51 is sealed air tight with respect to the outside.

Figure 15:
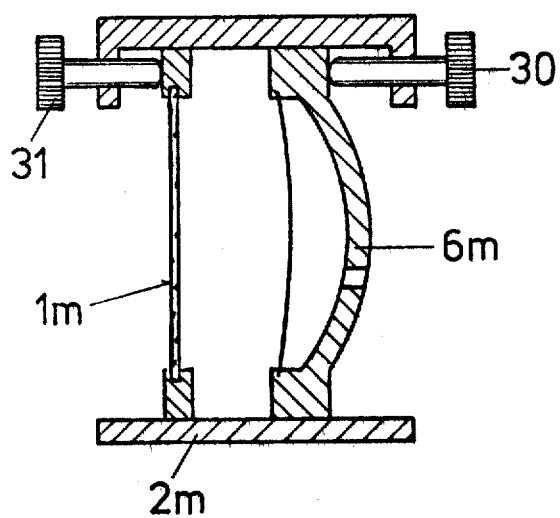
FIG. 15 illustrates a mirror in longitudinal section having a pair of adjustable walls.

The mirror according to FIG. 15 is similarly constructed as that in FIG. 10. The difference resides in that not only the support member 6m can be shifted or adjusted by means of the set screw 30, but also the glass disc 1m is adjustable by means of the set screws 31 which is screwed into the frame member 2m and thereby abuts with its shaft against the wall 1m.

Figure 16:
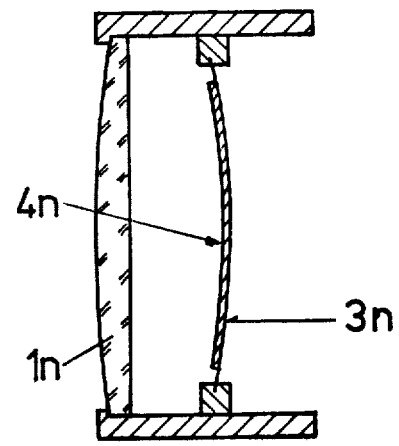
FIG. 16 illustrates a mirror in longitudinal section having an objective lens.

The mirror according to FIG. 16 differs from the mirror according to FIG. 3 in that instead of a plane parallel glass disc here an optical lens 1n is provided. An optical lens offers the possibility that imaging errors caused by the deformable wall 3n and the reflecting layer 4n can be corrected. It is clear that instead of a single lens one may use an objective member consisting of several individual members.

Figure 17:
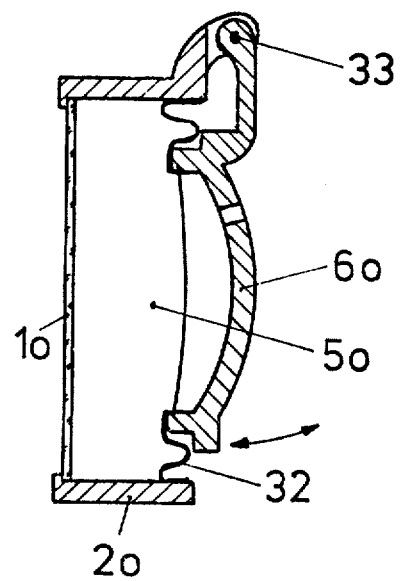
FIG. 17 illustrates a mirror in longitudinal section having supporting members which are tiltable.

The mirror according to FIG. 17 consists of a supporting member 6o pivotably mounted on the frame member 2o, a collar-type seal 32 which couples the supporting member 6o with the frame member 2o in an air-tight fashion and a glass plate 1o. In order to vary the pressure in space 5o the support member 6o is pivoted about the pivoting axle 33 in the direction of the arrow.

Figure 18:
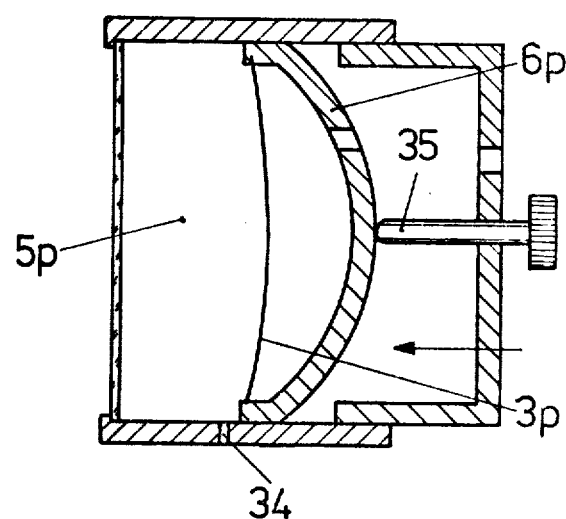
FIG. 18 illustrates a mirror in longitudinal section having a hollow space which can be evacuated.

The mirror according to FIG. 18 differs from that of FIGS. 3 and 4 in that the hollow space 5p is in connection with the outer atmosphere by means of a small bore 34 and when the deformable wall 3p and the supporting member 6p are in their back position, the members 3p, 6p are moved into the direction of the arrow by means, for example, of a set screw 35 then the supporting member 6p which operates as a piston will pass over the bore and will seal the space 5p air-tight with respect to the outside. When the further shifting occurs in the direction of the arrow then in space 5p a higher pressure develops which is necessary to cause an arching of the deformable wall 3p. This embodiment has the advantage that the hollow space 5p from time to time will be exposed to the normal pressure, that is, to the normal atmospheric pressure.

Figure 19:
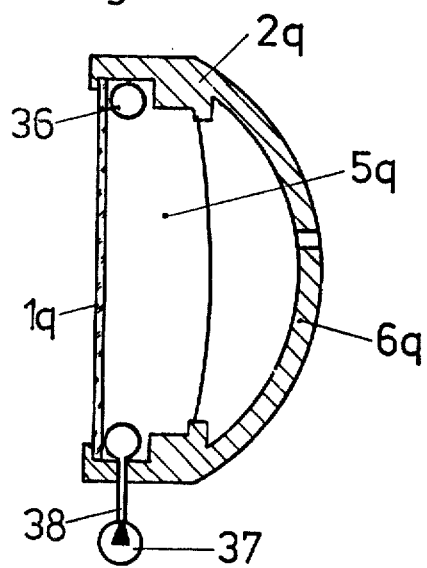
FIG. 19 illustrates a mirror in longitudinal section having a displacing member in the hollow space between the walls.

The mirror according to FIG. 19 consists of a supporting member 6q which is coupled with the frame member 2q and the glass plate 1q in an unmovable fashion. In order to vary the pressure in the hollow space 5q, it is necessary, that the hollow body provided in the hollow space in the form of an inflatable donut 36 be pumped up with the help of the pumping bellows 37 over the conduit 38 and in such a fashion that the donut 36 will act as a displacing member and thereby will displace a part of the air quantity contained in the hollow space 5q. This embodiment requires in contrast to the heretofore described mirror embodiments an additional pumping arrangement 37.

Figure 20:
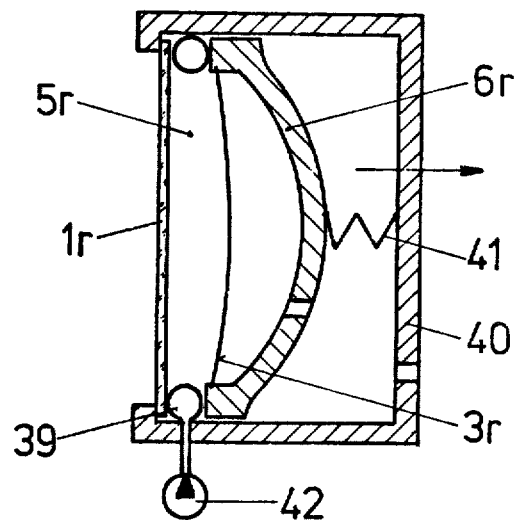
FIG. 20 illustrates a mirror in longitudinal section having an inflatable hollow profile for the shifting of one of the walls.

The mirror according to FIG. 20 is provided with an inflatable hollow body 39 placed between the glass plate 1r and the supporting member 6r which is capable to force or shift the supporting member together with the deformable wall 3r against the force of a compression spring 41 abutting against the housing 40 and move it in the direction of the arrow. In this case the inflatable hollow body 39 has also the function of pneumatic or hydraulic actuating cylinder. The member 39 can be in the form of a circular ring-like rubber hose as illustrated or as an inflatable air cushion or as a closed metal bellows or as a cylinder with an operating piston. The pressure medium itself, for example, air is supplied from the outside of the hollow space 5r by means of a pumping arrangement 42. Such pumping arrangement can be a pumping bulb or bellows, or a piston-type pump or a rubber ball similar to a perfume atomizer.

The mirror according to FIG. 21 has a deformable wall 3s which has different wall thickness. In the illustrated embodiment the wall in its middle region m is substantially thicker as in its edge zone r. If the pressure in the hollow space 5s between the glass wall 1s and the deformable wall 3s and the frame member 2s becomes increased by shifting the wall 3s in the direction of the arrow, then the wall 3s will arch itself outwardly, whereby the assumed arched position in the middle region m will show a less pronounced bulging than in the edge region r. Obviously it is possible that the edge zone of a deformable wall should be made thicker than the middle region thereof which then when increased pressure has its consequence in that the mirror in its center has a smaller radius of curvature than at its edge zone.

The mirror according to FIG. 22 has a supporting member 6t on which a one arm lever 43 is pivotably supported at 44, whereby the lever 43 abuts over a roller 45 against the inner wall 46 of the housing wall 47. On the lever 43 there is an operating rod 48 joined which over an aperture 49 extends or protrudes outside the housing. In the event the operating rod 48 is shifted in the direction of the arrow then the one arm lever 43 will increasingly shifting itself in the perpendicular direction with repsect to the wall of the housing 46 (as indicated with the dashed lines). By the pivoting of the lever 43 the distance x will change which is the distance between the supporting body 6t and the wall of the housing 46. If the operating rod 48 is pulled against the direction of the arrow, then the distance x will become smaller. This above described operating mechanics for the shifting of the deformable wall 3t and of the supporting member 6t has the advantage in that it is operable very simply and easily.

The mirror according to FIG. 23 is constructed in principle similar to the mirror of FIG. 22 however there is a difference in that instead of a lever 43 and the operating rod 48 here a deformable band 50 is provided on the back wall 51 of the housing, which, for example, can be made from a synthetic material or steel. If the end of the band 50 is pushed in the direction of the arrow then the angle w will change in that the synthetic band 50 is pushed in the direction against the supporting body 6u. The angle w becoming smaller will increase the distance y. In order that the band 50 should shift in the direction of the supporting member 6u at the appropriate location, fixed bolts 53, 54 are provided on the housing 51 against which the band 50 is supported.

The mirror according to FIG. 24 is similar to the one shown in FIG. 3, however, there is a difference in that the deformable wall 3v is provided with a reflecting layer 4v only partially (partial mirror) whereupon the sector 56 not provided with a mirror is transluscent so that the light rays coming from the lamp 58 (in the direction of the arrow) through the opening 57 and provided behind the supporting member 6v will fall directly onto the person observing the mirror or onto the object which is facing the mirror. The lamp in the illustrated embodiment is fixedly arranged on the frame member 2v. It can, however, also be provided on the supporting member 6v or (as not illustrated) secured to the back wall of the housing. The incandescent lamp itself can be surrounded by a light filter 59 which in turn is sub-divided into various sectors over its circular cylindrical body in order to attain different filtering effects.

It is noted that in not all the illustrated embodiments will the pressure in space 5 suffice in order to return the deformable walls in their initial position after they perform the required arching. In such cases the roll-back effect of the sealing elements (for instance part 28 in FIG. 14) can be considered. One may however within the framework of the invention provide devices (resetting devices) for the resetting of the supporting elements (such as by screws 21, 30, 31 which with their tip can abut against the wall which is to be shifted or against the supporting member 6).

We claim:

1. An adjustable focal length mirror comprising a tubular member, a first transparent wall closing one end of said tubular member, a second deformable wall having a reflecting surface in opposition to said transparent wall and defining a first hollow space in combination with a portion of said tubular member and with said transparent wall, a frame for supporting said deformable wall in spaced opposition to said transparent wall, means for sealing said supporting frame relative to said tubular member to thereby make said first hollow space airtight and means for displacing said supporting frame and said deformable wall in directions towards and away from said transparent wall.

2. The mirror according to claim 1 wherein said supporting frame and said deformable wall define a second hollow space therebetween and wherein said supporting frame includes an outlet for venting said second hollow space.

3. The mirror according to claim 1 wherein said displacing means comprises a cam arranged to bear against a portion of said supporting frame and means for rotating said cam.

4. The mirror according to claim 3 wherein said cam rotating means comprises a cam shaft journaled in said tubular member.

5. The mirror according to claim 1 wherein said reflecting surface is a metallic foil.

6. The mirror according to claim 1 wherein said reflecting surface is made of a synthetic material.

7. The mirror according to claim 1 wherein said tubular member includes a bellows section.

8. The mirror according to claim 1 wherein said displacing means comprises a pivotable ring bearing against said supporting frame, a lever for angularly displacing said ring and roller means for supporting said ring.

9. The mirror according to claim 1 wherein there is further included a profile ring for coupling said deformable wall to said tubular member.

10. The mirror according to claim 1 wherein said supporting frame is rigidly secured to said tubular member and wherein said displacing means comprises an inflatable ring and means for inflating said ring.

* * * * *